Jan. 22, 1963 J. S PILCH 3,074,384
PILOT-OPERATED BALL CHECK VALVE IN CYLINDER HEAD
Filed July 8, 1959 2 Sheets-Sheet 1

INVENTOR.
JOHN S. PILCH
BY Raymond A. Paquin
ATTORNEY

Jan. 22, 1963 J. S PILCH 3,074,384
PILOT-OPERATED BALL CHECK VALVE IN CYLINDER HEAD
Filed July 8, 1959 2 Sheets-Sheet 2

INVENTOR.
JOHN S. PILCH
BY
Raymond A. Paquin
ATTORNEY.

United States Patent Office 3,074,384
Patented Jan. 22, 1963

3,074,384
PILOT-OPERATED BALL CHECK VALVE IN
CYLINDER HEAD
John S. Pilch, % Ware Machine Works Inc.,
P.O. Box 140, Ware, Mass.
Filed July 8, 1959, Ser. No. 825,687
2 Claims. (Cl. 121—40)

This invention relates to new and improved hydraulic apparatus and has particular reference to the provision of a hydraulic cylinder having a flow control or check valve incorporated therein.

Another object is to provide a new and improved hydraulic cylinder and flow control or check valve combination wherein piston rod movement in the cylinder cannot occur in the event of breakage or leakage of a hydraulic line.

Other objects and advantages of the invention will be apparent from the following description taken in connection with the accompanying drawing, wherein one form of the invention has been given by way of illustration only.

It is extremely important that hydraulic circuits for tractor mounted apparatus, especially when used on stabilizers and outriggers on equipment, be designed so that were the hose leading from the cylinder to burst, the piston rod would not retract into the cylinder or extend it, which ever the case may be, for if this happened as a load is being carried in the bucket, the tractor could possibly turn over and at least would not remain stabilized. This problem has become so important that numerous manufacturers are providing flow control valves in the hydraulic system, which valves are connected to the cylinders by hoses but, if such hoses were to leak or break, the cylinder could extend or retract causing serious damage to equipment or personnel.

It is, therefore, the principal object of the present invention to provide a hydraulic cylinder with the flow control or check valve incorporated therein whereby it is impossible for a cylinder to retract through a failure of a hose or leaking past the spool on the main valve, which on ordinary equipment also causes cylinder retraction and whereby in the event of leakage or breakage of the hoses leading from the cylinder, the fluid will not escape from the push side of the cylinder unless the pull side of the cylinder is pressurized and thereby eliminates the possibility of cylinder retraction and damage to equipment or personnel.

Referring to the drawings.

Figure 1:
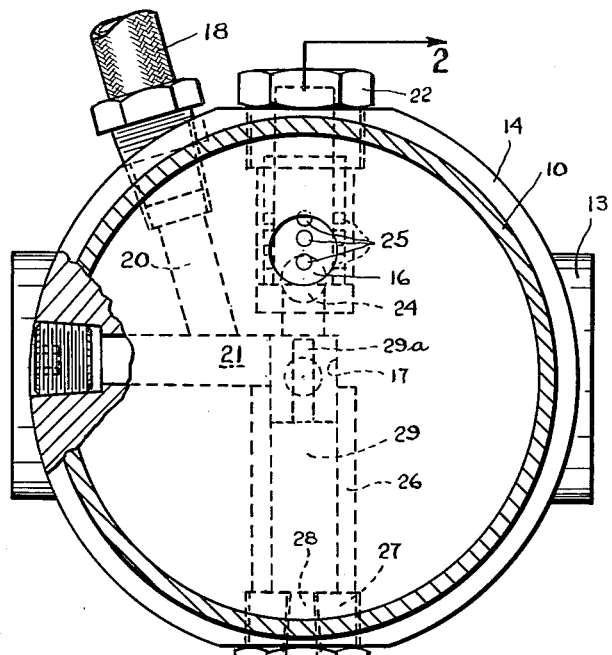
FIG. 1 is a sectional view through a cylinder illustrating the invention.
Figure 2:
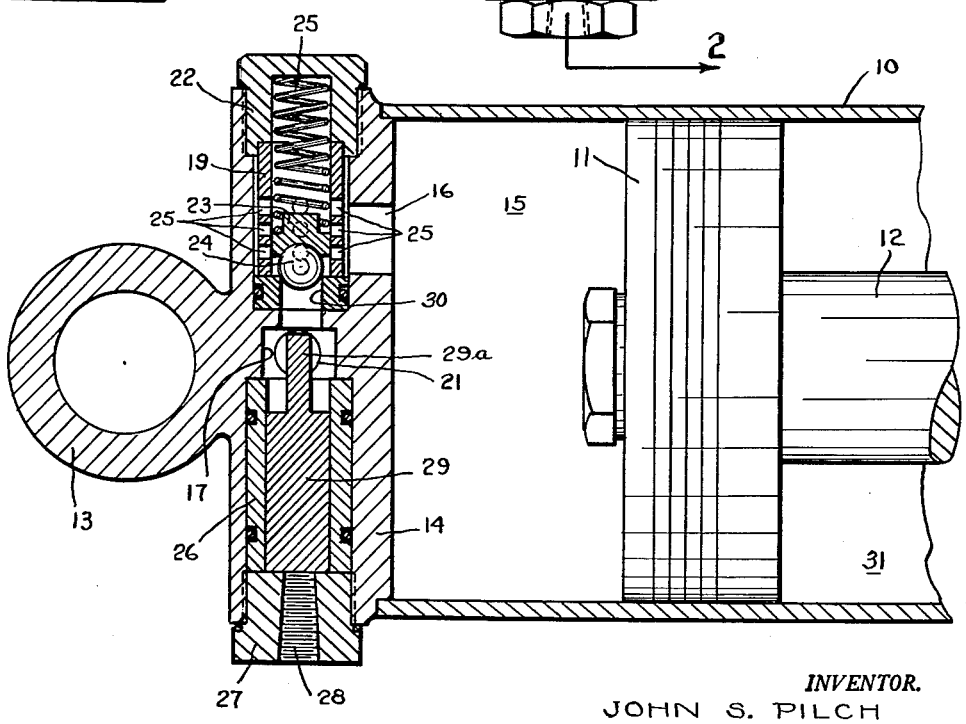
FIG. 2 is a sectional view taken on line 2—2 of FIG. 1, looking in the direction of the arrows.
Figure 3:
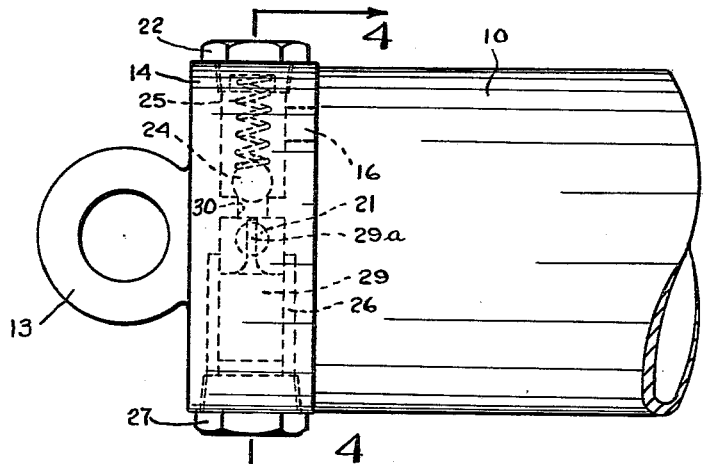
FIG. 3 is a fragmentary side view of the cylinder and further illustrating the invention.
Figure 4:
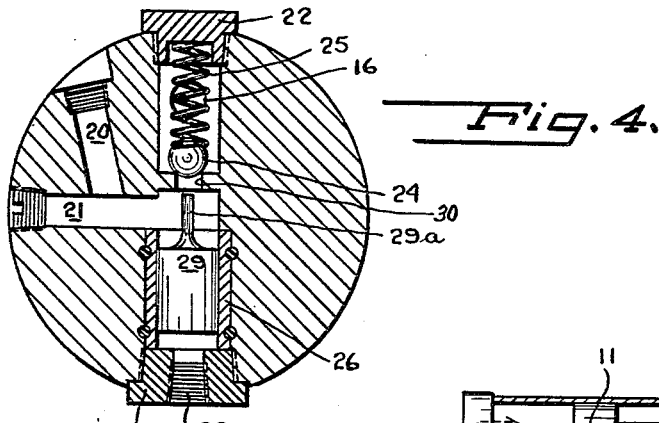
FIG. 4 is a sectional view taken on line 4—4 of FIG. 3, looking in the direction of the arrows.

Referring more particularly to the drawings wherein similar reference characters designate corresponding parts throughout, the arrangement shown embodying the invention comprises a hydraulic cylinder 10 in which is positioned the double acting piston 11 connected to the piston rod 12.

The cylinder 10 is provided with the cylinder hitch or pivot 13 for pivotally maintaining the cylinder in operative position.

In the end of the cylinder 10 is provided the end member or cap 14 in which is built the flow control or check valve comprising a bore designated generally at 17 normal to the cylinder axis and which is adapted to communicate with the push side 15 of cylinder 10 through passage or port 16, which is adapted to receive fluid from hydraulic line 18 from base or control valves 19a through ports 20 and 21 and bore 17 as hereinafter described.

In bore 17 and overlying port 16 is provided poppet slide 19 which is retained in position by threaded end cap 22 and within poppet slide 19 is provided poppet valve 23 adapted to be held in engagement with ball check member 24 by means of valve spring 25 which is compressed by end cap 22.

Poppet slide 19 is provided with a series of openings 25 for allowing the passage of fluid therethrough.

Adjacent the opposite end of bore 17 is provided piston bushing 26 which is retained in position by threaded end plug 27, which has the opening or fitting 28 for connection to a hydraulic line.

Within piston bushing 26 is provided plunger 29 which is mounted for sliding movement in the bore in piston bushing 26 and which has a reduced extension 29a adapted to disengage ball 24 from its seat 30 when piston 29 is urged inwardly by fluid through passage 28 to open the check valve.

Figure 5:
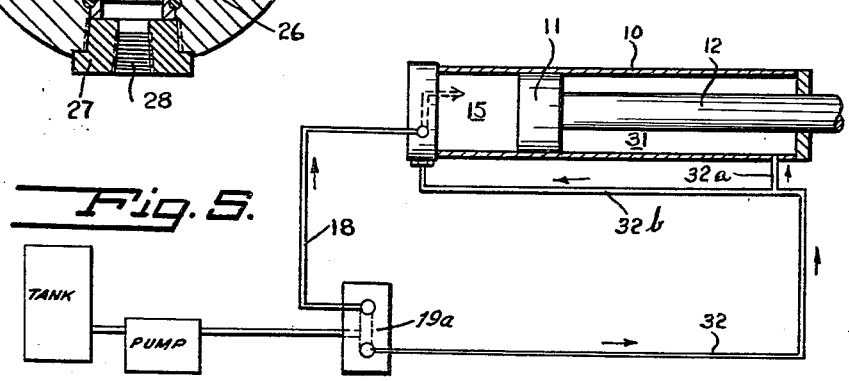
FIG. 5 is a schematic view of a hydraulic circuit embodying the invention.

As will be seen from FIG. 5, base or control valve 19 is connected to the push side 15 of cylinder 10 by means of hydraulic line 18 with the flow from the base valve 19 to the cylinder being in the direction of the arrow, and the pull side 31 of cylinder 10 is connected to base or control valve 19 by hydraulic line 32, which has a branch 32a connecting said line 32 with the pull side 31 of the cylinder and a branch 32b connected to fitting 28 of plunger 27 as previously described.

In the operation of the device fluid from base or control valve 19 flows through line 18, under pressure, and ports 20 and 21, opens check valve 24 and passes through port 16 into the push side 15 of cylinder 10 without restriction.

Fluid from the base or control valve 19a going to the pull side 31 of cylinder 10 will not pass through the circuit until pressure from branch 32b of line 32 pushes piston 29 and causes reduced end 29a of piston 29 to push check or ball valve 24 from its seat 30 to open this valve and allow exit of fluid from push side 15 of cylinder 10, while at the same time, fluid enters the pull side 31 of cylinder 10 through branch 32a of line 32.

It will thus be seen that fluid will not escape from the push side of the cylinder unless the pull side of the cylinder is pressurized to open the release passage and thus in the event of breakage of the hose leading from the cylinder that the piston rod will not retract from the cylinder or extend it, whichever the case may be, as the flow control or check valve would maintain pressure in the cylinder.

While a ball type check valve or flow control valve has been shown by way of illustration, it is pointed out that a spool valve could be employed for this purpose, if desired.

From the foregoing it will be seen that I have provided new and improved means for obtaining all of the objects and advantages of the invention.

I claim:

1. In a device of the character described, a hydraulic cylinder having a housing, a double acting piston in said cylinder, a flow control valve in said cylinder housing adjacent an end of said cylinder and allowing unrestricted passage of fluid into one side of said cylinder but restricting the exit of fluid from said cylinder, a hydraulic line for supplying fluid to the opposite side of said piston, said valve being further connected to said hydraulic line for supplying fluid to the one side of said piston and means including a piston extension to open said valve to allow the exit of fluid from said cylinder upon a differential fluid pressure in the hydraulic line to the opposite sides of the double acting piston.

2. In a device of the character described, a hydraulic cylinder having a housing, a double acting piston in said cylinder, a flow control valve in said cylinder housing adjacent an end of said cylinder and allowing unrestricted passage of fluid into one side of said cylinder but restricting the exit of fluid from said cylinder, a hydraulic line for supplying fluid to the opposite side of said piston, said valve being further connected to said hydraulic line for supplying fluid to the one side of said piston and opened thereby to allow the exit of fluid from said cylinder, said valve comprising a resiliently urged check valve member and a pressure actuated piston extension for urging said check valve member to open position upon a differential fluid pressure in the hydraulic line to the opposite sides of the double acting piston.

References Cited in the file of this patent

UNITED STATES PATENTS

| | | |
|---|---|---|
| 2,186,266 | Onions | Jan. 9, 1940 |
| 2,304,380 | Shaeffer | Dec. 8, 1942 |

FOREIGN PATENTS

| | | |
|---|---|---|
| 449,876 | Great Britain | July 3, 1936 |
| 603,795 | Great Britain | June 23, 1948 |